(12) United States Patent
Boggs

(10) Patent No.: US 6,599,358 B1
(45) Date of Patent: Jul. 29, 2003

(54) CARBON SCAVENGER FLY ASH PRETREATMENT METHOD

(75) Inventor: Bruce E. Boggs, Kennesaw, GA (US)

(73) Assignee: Mainland Laboratory, Ltd., San Antonio, TX (US)

( * ) Notice: Subject to any disclaimer, the term of this patent is extended or adjusted under 35 U.S.C. 154(b) by 164 days.

(21) Appl. No.: 09/804,737

(22) Filed: Mar. 13, 2001

Related U.S. Application Data

(60) Provisional application No. 60/188,737, filed on Mar. 13, 2000.

(51) Int. Cl.$^7$ ................................................ C04B 18/06
(52) U.S. Cl. .................... 106/705; 106/709; 106/DIG. 1
(58) Field of Search ................................ 106/705, 709, 106/DIG. 1

(56) References Cited

FOREIGN PATENT DOCUMENTS

PL        126245        *   7/1983

* cited by examiner

*Primary Examiner*—Paul Marcantoni
(74) *Attorney, Agent, or Firm*—Jackson Walker L.L.P.

(57) ABSTRACT

A method for pretreatment of a quantity of fly ash for use in a cementitious composition containing an air entrainment agent. An effective amount of an aromatic carboxylic acid or its salts is added to the fly ash to satiate unburned carbon in the ash. The treatment with the aromatic carboxylic acid (or hydroxy substituted aromatic carboxylic acid or its salts) does not significantly promote or retard the air entrainment functions of the air entrainment agent.

7 Claims, No Drawings

CARBON SCAVENGER FLY ASH PRETREATMENT METHOD

This application claims priority to co-pending U.S. Provisional Patent Application No. 60/188,737, filed Mar. 13, 2000.

BACKGROUND OF THE INVENTION

Coal fired power plants generate fly ash from the combustion of pulverized coal, or combinations of pulverized coal and other carbonaceous supplemental fuels such as petroleum coke, woodbark, charcoal, wood, residual fibers, etc. The fly ash is captured in the power plant's emission control devices, such as by electrostatic precipitators and baghouses. The principal composition of fly ash includes an inert mineral fraction consisting primarily of ferro-aluminosilicate glass and residual unburned carbon from coal and/or other supplemental fuels.

The inert mineral fraction of fly ash is a pozzolan, which makes fly ash an acceptable mineral admixture for use in Portland cement concrete. The fly ash itself includes the devolatized mineral matter which has been trapped or loosely associated with the coal as well as incombustible components and elements of the coal and/or of the supplemental fuels. In addition to such incombustible components, the fly ash contains carbon rich particles which have not been completely combusted, usually due to the inefficiency of the boiler design or related conditions.

Specifications for the use of fly ash in Portland cement concrete are set out in ASTM #C-618. This specification limits the loss-on-ignition (LOI) content of fly ash pozzolan to less than 6%. The LOI value of fly ash in generally equal to the percent by weight of the unburned carbon content of the fly ash. This carbon content can vary from as little as about 0.5% up to 20% or more of the weight of the total fly ash product. However, for pozzolanic activity, a good quality fly ash should contain less than 1% carbon but, in any case, no more than 4% carbon.

A high carbon fly ash as a pozzolanic mixture has a detrimental impact upon the quality of concrete. The presence of carbon reduces air entrainment, which, in many locations, is the only real protection that concrete has against freeze-thaw/wet-dry conditions. Therefore, the lower the carbon content, the better the concrete mix is from an air entrainment perspective. The presence of carbon also increases water requirements, reduces pozzolanic reactivity, and degrades the appearance of finished concrete surface. Thus, carbon negatively affects the strength, durability, and aesthetic appearance of concrete. Therefore, the lower the carbon content in any fly ash, the better the fly ash as a concrete admixture.

In many cases, air entrainment agents (AEA) are added to the concrete mix in order to desirably increase the amount of small air bubbles that are formed during mixing. In these cases, carbon reduces the ability of these agents to operate efficiently.

SUMMARY OF THE INVENTION

The present invention is directed to a chemical treatment that may be applied to the high carbon content fly ash either prior to or concurrent with its mixing with the other concrete components.

Specifically, aromatic carboxylic acid or hydroxy substituted aromatic carboxylic acid is added to a quantity of fly ash to reduce air entraining chemical demand. Such aromatic carboxylic acids include benzoic, phthalic, isophthalic, and terephthalic acids and their salts. Included in the hydroxy substituted aromatic carboxylic acids found effective are salicylic acid, m-hydroxybenzoic acid, and p-hydroxybenzoic acid and their salts.

DETAILED DESCRIPTION OF THE PREFERRED EMBODIMENT

Recent emphasis has been given to the removal of the carbon from the fly ash before utilization (i.e. mixing) of the ash component in the concrete, such as Portland cement concrete (PCC). These chemical treatments or chemical carbon scavengers must somehow satisfy the affinity of the carbon for the commonly used air-entraining agents. At the same time, the use of just any chemical is not acceptable since the chemical itself must not entrain air when the ash is used in the PCC, nor must the chemical inhibit the intended, desirable functions of the AEA.

Accordingly, "air neutral" agents must be used to improve the air entrainment properties of the carbon containing ash. That is, these chemical carbon scavengers should not significantly promote air entrainment by themselves or retard air or bubble formation. However, these scavengers should be adsorbed onto the carbon, thus satisfying the affinity or appetite that the carbon otherwise would have for the AEAs.

Pretreatment of the fly ash by the chemical carbon scavenger may be performed simultaneously with other chemical treatments applied to the ash, such as those that may be used to reduce the $NH_3$ content of the ash.

At present, exemplary chemical carbon scavengers have been found to include the aromatic carboxylic acids such as benzoic, phthalic, isophthalic, and terephthalic acids and their salts and the hydroxy substituted aromatic carboxylic acids such as salicylic acid, m-hydroxybenzoic acid and p-hydroxybenzoic acid and their salts.

Based upon available preliminary test data, salicylic acid and its salts may be preferred, with lithium salicylate perhaps the most preferred at present. It has been noted that treatment of 100 g of ash with 0.07 g lithium salicylate has achieved at least 30% reduction of air entraining chemical demand. Further, this particular carbon scavenger did not exhibit either air entrainment or suppression. It is anticipated that treatment dosages of these scavengers will range from 0.01 g to 100 g chemical carbon scavenger based on 100 g of fly ash.

Other additional candidate chemical carbon scavengers include families of dyes and multi-ring aromatics as well as some alkyl-aryl compounds.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is claimed is:

1. A method for pretreating fly ash for use in cementitious compositions containing an air entrainment agent comprising the steps of:
   applying an effective amount of an aromatic carboxylic acid or its salts to a quantity of fly ash to satiate unburned carbon in said ash and not promote or retard air entrainment functions of said air entrainment agent.

2. The method of claim 1 wherein said aromatic carboxylic acid or its salts is a hydroxy substituted aromatic carboxylic acid or its salts.

3. The method of claim 1 wherein said aromatic carboxylic acid is selected from the group consisting of benzoic acid, phthalic acid, isophthalic acid, terephthalic acid and their salts.

4. The method of claim 2 wherein said hydroxy substituted carboxylic acid is selected from the group consisting of salicylic acid, m-hydroxybenzoic acid, p-hydroxybenzoic acid, and their salts.

5. The method of claim 1, wherein said aromatic carboxylic acid is lithium salicylate.

6. The method of claim 1 wherein said amount of carboxylic acid is in the range of about 0.01 g to about 100 g for each 100 g of said fly ash.

7. The method of claim 5, wherein said effective amount of lithium salicylate is about 0.07 g for each 100 g of said fly ash.

* * * * *